United States Patent
Rickey

(10) Patent No.: US 11,835,935 B2
(45) Date of Patent: Dec. 5, 2023

(54) POWER TOOL ELEMENT INDICATING SYSTEM AND METHOD

(71) Applicant: TECHTRONIC CORDLESS GP, Anderson, SC (US)

(72) Inventor: Todd Rickey, Rowville (AU)

(73) Assignee: Techtronic Cordless GP, Anderson, SC (US)

(*) Notice: Subject to any disclaimer, the term of this patent is extended or adjusted under 35 U.S.C. 154(b) by 0 days.

(21) Appl. No.: 16/951,732

(22) Filed: Nov. 18, 2020

(65) Prior Publication Data

US 2021/0173378 A1 Jun. 10, 2021

(30) Foreign Application Priority Data

Dec. 6, 2019 (HK) .................................. 19133288.1

(51) Int. Cl.
  G05B 19/4065 (2006.01)
(52) U.S. Cl.
  CPC .................. G05B 19/4065 (2013.01)
(58) Field of Classification Search
  CPC ............................. G05B 19/4065; B25F 5/00
  USPC .......................................................... 700/175
  See application file for complete search history.

(56) References Cited

U.S. PATENT DOCUMENTS

| | | | | |
|---|---|---|---|---|
| 2003/0182014 A1* | 9/2003 | McDonnell | ........ | G05B 19/4065 700/159 |
| 2015/0070183 A1* | 3/2015 | Farah | .................. | B23K 9/1006 340/680 |
| 2016/0263674 A1* | 9/2016 | Laliberte | .............. | B23D 45/067 |
| 2018/0272491 A1* | 9/2018 | Yang | .................. | B23Q 17/2457 |
| 2019/0143467 A1* | 5/2019 | Wang | ....................... | G01N 3/58 700/175 |
| 2019/0176727 A1* | 6/2019 | Haluska | ................. | H02J 7/0063 |
| 2020/0030936 A1* | 1/2020 | Knudson | ................. | B24B 23/06 |
| 2020/0209831 A1* | 7/2020 | Chen | ........................ | G06N 3/08 |

FOREIGN PATENT DOCUMENTS

| | | |
|---|---|---|
| WO | WO2015161829 A1 | 10/2015 |
| WO | WO2016145191 A1 | 9/2016 |
| WO | WO2018160658 A2 | 9/2018 |

OTHER PUBLICATIONS

European Search Report for EP Patent Application No. EP20211872 dated Apr. 21, 2021; 3 pages.

* cited by examiner

*Primary Examiner* — Kenneth M Lo
*Assistant Examiner* — Mohammed Shafayet
(74) *Attorney, Agent, or Firm* — Dority & Manning, P.A.

(57) ABSTRACT

A power tool element indicating system (100) comprises a detection device (102) in communication with a replaceable and/or adjustable element (104), such as a blade, a chain or other element, of a power tool (106), to determine that the replaceable and/or adjustable element of the power tool requires replacement or adjustment. The system comprises an indicator (108), such as a LED, or a display, or other indicator, in communication with the detection device to indicate to a user that the replaceable and/or adjustable element requires replacement or adjustment.

24 Claims, 6 Drawing Sheets

POWER TOOL ELEMENT INDICATING SYSTEM AND METHOD

FIELD OF THE INVENTION

The present invention relates to power tool element indicating systems and methods and power tools comprising such systems and methods.

BACKGROUND TO THE INVENTION

Power tools, gardening tools and the like often have a replaceable and/or adjustable element. For example, many power tools and gardening tools have one or more replaceable elements in the form of a rotating or reciprocating blade that is worn down or blunted over time through use. Once the blade no longer cuts effectively, the blade needs to be replaced. However, one problem associated with such replaceable blades is the user being unaware that the blade needs to be replaced. For example, some power tools still perform their function, albeit less effectively and/or less efficiently, even though the blade needs to be replaced. In other examples, such as with some rotary or cylindrical lawn mowers, the blade is not visible to the user during ordinary use of the power tool such that the user is not aware that the blade needs to be replaced.

Many power tools and gardening tools have an adjustable element, the position of which can be adjusted according to different requirements, such as the type of power tool, a particular application and/or an extent of use of the element. For example, a chain of a chainsaw is one form of an adjustable element, which is also a replaceable element. The tension of a chainsaw chain typically reduces through use and often needs to be adjusted to increase the tension of the chain. If the chain becomes too loose, the cutting efficiency and effectiveness of the chain is impaired and in some cases, the chain can detach from the guide bar of the chainsaw.

For some power tools and gardening tools, it is possible to install a replaceable and/or adjustable element incorrectly, yet the tool can still operate and seem to perform its function. For example, for at least some chainsaws, it possible, and quite easy, to install the chain backwards on the guide bar. The chainsaw will still operate and seem to work to the user, but the blades are facing in the wrong direction and so do not cut properly, which can damage the chain and the chainsaw.

For other power tools and gardening tools, it is necessary for certain types of replaceable and/or adjustable elements to have a particular clearance to allow for, for example, adequate airflow. In other examples, multiple positions for a replaceable and/or adjustable element are possible in a single tool, but the correct positions are not apparent to the user and/or which position achieves which effect.

SUMMARY OF THE INVENTION

It is a preferred object of the present invention to provide a system and/or a method that addresses, or at least ameliorates, one or more of the aforementioned problems and/or provides a useful commercial alternative.

According to one aspect, but not necessarily the broadest aspect, the present invention resides in a power tool element indicating system comprising:

a detection device in communication with a replaceable and/or adjustable element of a power tool to determine whether the replaceable and/or adjustable element of the power tool requires replacement or adjustment; and an indicator in communication with the detection device to indicate that the replaceable and/or adjustable element requires replacement or adjustment.

Preferably, the detection device is configured to record operation of the replaceable and/or adjustable element, compare the recorded operation with a threshold value and determine that the replaceable and/or adjustable element requires replacement or adjustment when the recorded operation equals or exceeds the threshold value.

Suitably, the detection device is configured to record one or more of the following operations of the replaceable and/or adjustable element: a cumulative duration of use; a number of rotations; a rate of rotation; a number of oscillations; a number of reciprocations; a number of cycles; a number of movements.

Preferably, the detection device is configured to determine a position and/or orientation and/or other characteristic of the replaceable and/or adjustable element, compare the determined position and/or orientation and/or other characteristic with a threshold value or a range and determine that the replaceable and/or adjustable element requires replacement or adjustment when the determined position and/or orientation and/or other characteristic does not comply with the threshold value or the range.

Suitably, the detection device is configured to determine one or more of the following of the replaceable and/or adjustable element: a level of wear; a wear profile; an electric current profile; a separation from a part of the power tool; a level of protrusion; an installation orientation; a level of tension.

Suitably, the detection device analyses a determined characteristic of the replaceable and/or adjustable element, such as, but not limited to, the level of wear, and/or the wear profile, to determine an estimated remaining lifespan of the replaceable and/or adjustable element.

Suitably, the detection device disables operation of the power tool if the detection device determines that the replaceable and/or adjustable element requires replacement or adjustment.

Preferably, the detection device resets or deletes the recorded operation of the replaceable element when the detection device determines that the replaceable element has been replaced.

Preferably, the detection device resets the indicator when the detection device determines that the replaceable and/or adjustable element has been replaced or adjusted.

Suitably, the detection device determines whether the replaceable and/or adjustable element is compatible with the power tool.

Suitably, the indicator comprises one or more of the following: an illumination device; an LED; a display; a liquid crystal display (LCD); a touch sensitive display; an audible indicator.

Suitably, the indicator is part of a user's computing device, such as a mobile phone, tablet or computer.

Suitably, the detection device comprises a wireless reader mounted on, in or to the power tool, the wireless reader in communication with a wireless transmitter attached to, embedded in, or part of the replaceable and/or adjustable element.

According to another aspect, but not necessarily the broadest aspect, the present invention resides in a power tool element indicating method comprising:

determining, by a detection device in communication with a replaceable and/or adjustable element of a power tool, whether the replaceable and/or adjustable element of the power tool requires replacement or adjustment; and indicating, by an indicator in communication with the detection device, that the replaceable and/or adjustable element requires replacement or adjustment.

The method may comprise the detection device:
recording operation of the replaceable and/or adjustable element;
comparing the recorded operation with a threshold value; and
determining that the replaceable and/or adjustable element requires replacement or adjustment when the recorded operation equals or exceeds the threshold value.

The method may comprise the detection device recording one or more of the following operations of the replaceable and/or adjustable element: a cumulative duration of use; a number of rotations; a rate of rotation; a number of oscillations; a number of reciprocations; a number of cycles; a number of movements.

The method may comprise the detection device:
determining a position and/or orientation and/or other characteristic of the replaceable and/or adjustable element;
comparing the determined position and/or orientation and/or other characteristic with a threshold value or a range; and
determining that the replaceable and/or adjustable element requires replacement or adjustment when the determined position and/or orientation and/or other characteristic does not comply with the threshold value or the range.

The method may comprise the detection device determining one or more of the following of the replaceable and/or adjustable element: a level of wear; a wear profile; an electric current profile; a separation from a part of the power tool; a level of protrusion; an installation orientation; a level of tension.

The method may comprise the detection device analyzing a determined characteristic of the replaceable and/or adjustable element and determining an estimated remaining lifespan of the replaceable and/or adjustable element.

The method may comprise the detection device disabling operation of the power tool if the detection device determines that the replaceable and/or adjustable element requires replacement or adjustment.

The method may comprise the detection device resetting or deleting the recorded operation of the replaceable element when the detection device determines that the replaceable element has been replaced.

The method may comprise the detection device resetting the indicator when the detection device determines that the replaceable and/or adjustable element has been replaced or adjusted.

The method may comprise the detection device determining whether the replaceable and/or adjustable element is compatible with the power tool.

According to another aspect, but not necessarily the broadest aspect, the present invention resides in a power tool element indicating system comprising a detection device in communication with a replaceable and/or adjustable element of a power tool to:
determine one or more characteristics of the replaceable and/or adjustable element; and
analyze the one or more characteristics to determine an estimated remaining lifespan of the replaceable and/or adjustable element.

Preferably, the system comprises an indicator in communication with the detection device to display the estimated remaining lifespan of the replaceable and/or adjustable element.

Preferably, the detection device is configured to perform one or more of the aforementioned operations.

According to another aspect, but not necessarily the broadest aspect, the present invention resides in a power tool comprising the aforementioned power tool element indicating system.

Suitably, the power tool is selected from one of the following: a lawn mower; a lawn edger; a circular saw; a jigsaw; a reciprocating saw; a mulcher; a chipper; a chainsaw; a pole pruner; a drill; a power file; a sander; a belt sander; an orbital sander; a grinder; a hedge trimmer; a stapler; a sweeper; a router; a nail gun; or other power tool.

Suitably, the replaceable and/or adjustable element is selected from one of the following: a blade; a catching blade; a cutting blade; a mulching blade; a hybrid blade; a chainsaw chain; an abrading element; a brush; a drill chuck; a carriage; a carrier, or other element.

Further features and/or aspects of the present invention will become apparent from the following detailed description.

BRIEF DESCRIPTION OF THE DRAWINGS

Embodiments of the present invention will now be described by way of example only with reference to the accompanying drawings in which like reference numerals refer to like features. In the drawings.

Figure 1:
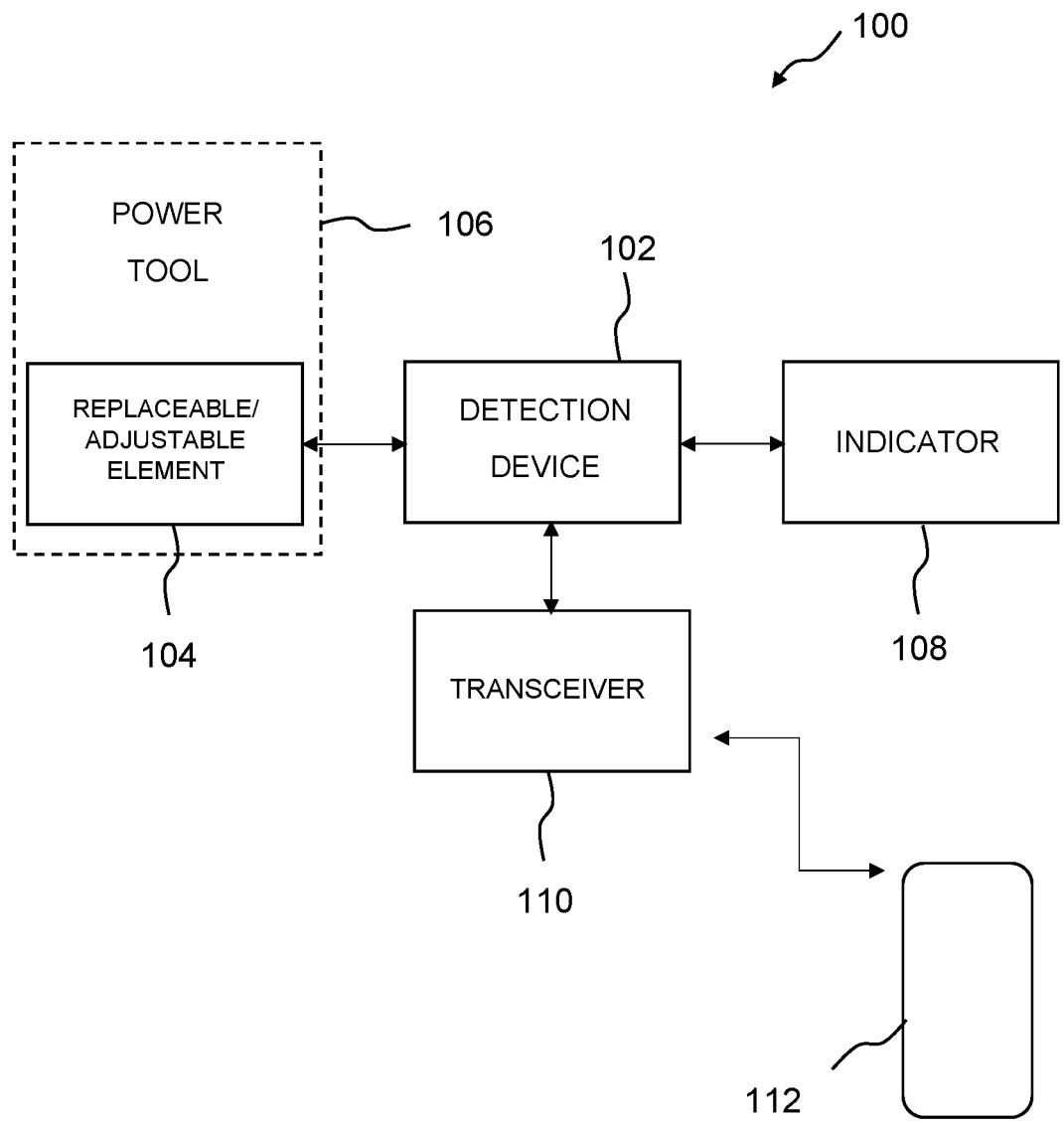
FIG. 1 is a schematic diagram of a power tool element indicating system according to an embodiment of the present invention.

Skilled addressees will appreciate that elements in the drawings are illustrated for simplicity and clarity and have not necessarily been drawn to scale. For example, the relative dimensions of some of the elements in the drawings may be distorted and/or some elements may be omitted to help improve understanding of embodiments of the present invention.

DETAILED DESCRIPTION

Embodiments of the present invention are directed to power tool element indicating systems and methods and power tools comprising such systems. Herein, the term "power tool" refers to any power tool, gardening tool or the like for domestic, commercial or industrial use comprising an element, such as a blade, a chain or other element that is replaceable and/or adjustable. The power tool can be electrically operated by an alternating current (AC) or direct current (DC) power supply. However, it is envisaged that the present invention can also be used with tools comprising a power supply in the form of an internal combustion (IC) engine, such as a 2-stroke or 4-stroke engine and having an electric circuit for the present invention.

With reference to FIG. 1, according to some embodiments, the present invention is a power tool element indicating system 100 comprising a detection device 102 in communication with a replaceable and/or adjustable element 104 of a power tool 106 to determine that the replaceable and/or adjustable element 104 of the power tool 106 requires replacement or adjustment. The power tool element indicating system 100 comprises an indicator 108 in communication with the detection device 102 to indicate that the replaceable and/or adjustable element 104 requires replacement or adjustment.

According to some embodiments, the detection device 102 is configured to detect and record operation of the replaceable and/or adjustable element 104, compare the recorded operation with a threshold value and determine that the replaceable and/or adjustable element 104 requires replacement or adjustment when the recorded operation equals or exceeds the threshold value. For example, the detection device 102 can detect and record for how much time the replaceable and/or adjustable element 104 has been in use and compare the recorded usage time with a threshold time value. When the cumulative recorded usage equals or exceeds the threshold time value, the detection device 102 transmits a signal to the indicator 108 and the indicator 108 indicates that the replaceable and/or adjustable element 104 requires replacement or adjustment. In some instances, the element 104 will need replacing when the threshold time value is reached or exceeded. In some instances, when the threshold time value is reached or exceeded, the element 104 will require adjustment, for example, changing a mounting position of the element 104 to compensate for a level of wear in the element 104 after the threshold time value of use.

Different power tools will have different modes of operation. For example, lawn mowers, lawn edgers, circular saws, mulchers and many other power tools have rotating elements in the form of blades, such as cutting blades, catching blades, hybrid blades or mulching blades. Other power tools, such as jigsaws and reciprocating saws, have reciprocating elements in the form of sawtooth blades. Other power tools have continuous cutting or abrading elements, such as the chains of chainsaws and pole pruners, which move along a guide bar, or abrasive belts as used in power files or belt sanders. Other tools have replaceable/adjustable elements in the form of brushes, drill chucks, or carriages or carriers for loading a consumable, such as fasteners, e.g. as used in a nail gun.

According to some embodiments of the present invention, the detection device 102 is configured to record one or more of the following operations of the replaceable and/or adjustable element 104: a cumulative duration of use; a number of rotations; a rate of rotation, i.e., revolutions per minute (RPM) or other rate measurement; a number of oscillations; a number of reciprocations; a number of cycles; a number of movements.

Consequently, according to some embodiments, the detection device 102 is configured to detect and record the relevant operation of the replaceable and/or adjustable element 104, compare the recorded operation with a threshold value for the relevant operation and determine that the replaceable and/or adjustable element 104 requires replacement or adjustment when the recorded relevant operation equals or exceeds the threshold value for that operation.

According to some embodiments, the detection device 102 is configured to determine a position and/or an orientation and/or other characteristic of the replaceable and/or adjustable element 104. The detection device 102 is configured to compare the determined position and/or orientation and/or other characteristic of the replaceable and/or adjustable element 104 with a threshold value or a range for the position and/or orientation and/or other characteristic. The detection device 102 is configured to determine that the replaceable and/or adjustable element 104 requires adjustment when the determined position and/or orientation and/or other characteristic of the replaceable and/or adjustable element 104 does not comply with the threshold value or the range.

In particular, the detection device 102 is configured to determine one or more of the following of the replaceable and/or adjustable element 104: a level of wear; a profile; a separation from a part of the power tool 106; a level of protrusion; an installation orientation; a level of tension.

For example, in relation to a chain of a chainsaw, in some embodiments, the detection device 102 can determine whether the chain is installed on the guide bar in the correct orientation, i.e. in a forward, cutting direction, and not installed backwards. In some embodiments, the detection device 102 can determine whether the tension of the chain is sufficient. In another example, according to some embodiments of the present invention, the detection device 102 can determine whether the replaceable and/or adjustable element 104 has the required separation or clearance from, for example, a body, cage, guard or cover of the power tool 106, to ensure that, for example, the replaceable and/or adjustable element 104 does not catch on the body, cage, guard or cover of the power tool 106 and/or provides adequate airflow. In other examples, according to some embodiments of the present invention, the detection device 102 can determine a level of wear of the replaceable and/or adjustable element 104 such that when the element 104 has been worn down through use below a threshold level, such as, but not limited to 50%, 55%, 60%, 65%, 70%, 75%, 80%, 85% of the original, unused level, the detection device 102 transmits a signal to the indicator 108 to indicate that the replaceable and/or adjustable element 104 needs replacing or adjusting. Whether the indicator 108 indicates replacement or adjustment will depend on the level of wear. A lower level of wear will likely result in an indication by the indicator 108 that the element 104 can be adjusted and does not need to be replaced. A higher level of wear may result in an indication by the indicator 108 that the element 104 needs to be replaced. In some instances, although the replaceable and/or adjustable element 104 may not have been used for a cumulatively long period of time and show low levels of wear, a high impact event, such as a collision of the element 104 with a rock or other hard object can be detected by the detection device 102, for example, by analyzing the resultant profile of the element 104. Such a collision may deform the profile of the element 104, rendering the element inoperable, inefficient or ineffective in its intended operation, such that the element 104 needs to be replaced.

According to some embodiments, the detection device 104 analyses a determined characteristic of the replaceable and/or adjustable element 104, such as, but not limited to, the level of wear, and/or the profile of the element 104, to determine an estimated remaining lifespan of the replaceable and/or adjustable element 104. For example, if the replaceable and/or adjustable element 104 is expected to have a lifespan of 6 months based on x rotations of the element 104 or y hours of use, if the detection device 104 determines that the element 104 has undergone x/2 rotations or been used for x/2 hours, the detection device 104 determine can determine that the remaining lifespan of the replaceable and/or adjustable element 104 is approximately 3 months.

According to some embodiments of the present invention, the detection device 102 disables operation of the power tool 106 if the detection device 102 determines that the replaceable and/or adjustable element 104 requires replacement or adjustment. This can prevent, for example, damage to the power tool 106 and/or ineffective or inefficient operation and/or potential damage to the environment being worked upon and/or potential hazard to the user.

According to some embodiments, the detection device 102 resets or deletes the recorded operation of the replaceable element 104 when the detection device 102 determines that the replaceable element 104 has been replaced. The detection device 102 can then record new data for the newly replaced element 104.

According to some embodiments, the detection device 102 resets the indicator 108 when the detection device 102 determines that the replaceable and/or adjustable element 104 has been replaced or adjusted. The indicator 108 is therefore ready to display information pertinent to the newly replaced element 104.

According to some embodiments of the present invention, the detection device 102 determines whether the replaceable and/or adjustable element 104 is compatible with the power tool 106. For example, common fittings may be used for different types of element 104 suitable for different types of power tool. In some embodiments, the detection device 102 can determine whether the replaceable and/or adjustable element 104 is appropriate, suitable for, and/or compatible with the power tool 106 to which it is attached and display an appropriate indication via the indicator 108.

According to some embodiments, the indicator 108 comprises one or more of the following: an illumination device, such as, but not limited to a light emitting diode (LED); a display, such as a liquid crystal display (LCD) or a touch sensitive display; an audible indicator. For example, in some embodiments, under the relevant conditions as described herein, the detection device 102 causes the indicator 108 in the form of an LED to illuminate to indicate to a user that the replaceable and/or adjustable element 104 needs to be replaced or adjusted. In some embodiments, the LED or other illumination device can emit a first colour to indicate that the element 104 needs to be replaced and can emit a second colour to indicate that the element needs to be adjusted. In other embodiments, where the indicator 108 is in the form of a display, the display can display one or more icons or other indicators to indicate to a user that the element 104 needs to be replaced or adjusted or to indicate another characteristic of the element 104, such as an impact event, a wear profile or other event that requires inspection of the element 104 by the user.

In some embodiments, where the display is a touch sensitive display, the display can receive inputs from a user to indicate that, for example, the element 104 has been replaced or adjusted or to reset the indicator 108.

In some embodiments, where the indicator 108 is in the form of a display, the display can be the display of user's device 112, such as a mobile phone, tablet or other computing device, rather than, or in addition to a display provided on, or part of, the power tool 106. In such embodiments, the detection device 102 can communicate with the user's device 112, such as a mobile phone, tablet or other computing device, via a transceiver 110 in communication with the detection device 102. According to different embodiments, the transceiver 110 can be capable of using one or more communication protocols, such as, but not limited to, Bluetooth, WiFi, near field communication (NFC), 3G, 4G or 5G, to enable the detection device 102 of the system 100 to communicate with the user's device 112. In such embodiments, the user can interact with the system 100 via the user's device 112 to indicate that, for example, the element 104 has been replaced or adjusted or to reset the indicator 108.

Figure 2:
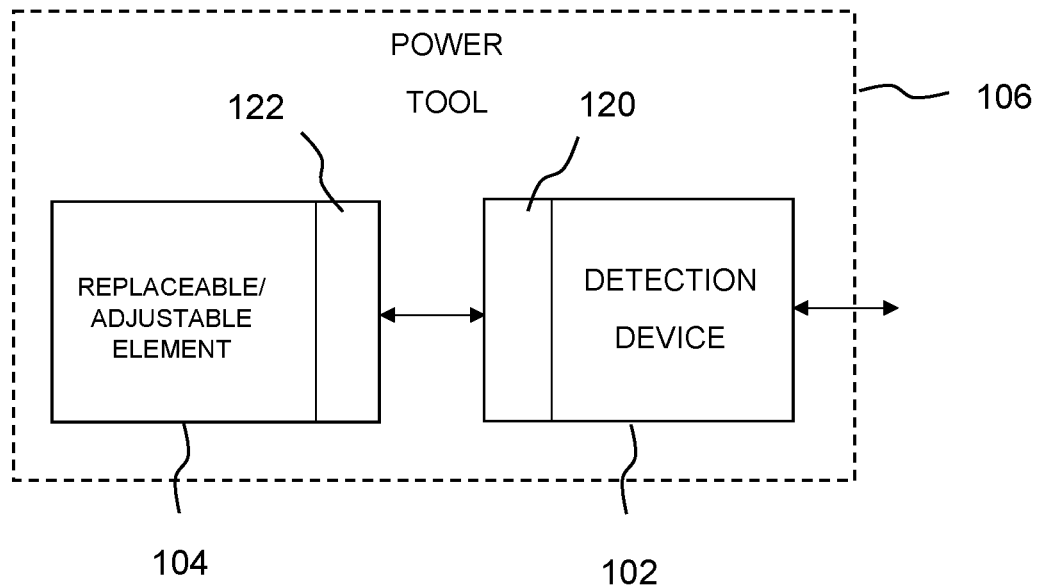
FIG. 2 is a schematic diagram of part of a power tool element indicating system according to an embodiment of the present invention.

According to some embodiments, and with reference to FIG. 2, the detection device 102 comprises a wireless reader 120, such as a radio frequency identification (RFID) reader 120 mounted on, to or in the power tool 106. In such embodiments, the RFID reader 120 is in communication with a wireless transmitter 122, such as an RFID chip 122 attached to, mounted to or associated with the replaceable and/or adjustable element 104. The RFID reader 120 receives data from the RFID chip 122 to enable the detection device 102 to detect and record operational data relating to the replaceable and/or adjustable element 104 as described herein to enable the detection device 102 to make the determinations as described herein regarding whether the replaceable and/or adjustable element 104 needs to be replaced or adjusted. In such embodiments, when the element 104 is replaced, the RFID reader 120 reads the new RFID of the replacement element 104 and resets or deletes the recorded operation for the element 104 and resets the indicator 108.

According to other embodiments, the detection device 102 comprises another type of wireless reader 120 mounted on, to or in the power tool 106 capable of communication with another type of transmitter 122 attached to, mounted to or associated with the replaceable and/or adjustable element 104 according to another communications protocol, such as Bluetooth, WiFi, or near field communication (NFC).

It will be appreciated that the particular implementation of the present invention and the extent of functionality can depend on the particular power tool 106 and the nature of the replaceable and/or adjustable element 104. For example, where the power tool 106 is a mower and the replaceable and/or adjustable element 104 is a mower blade, the RFID chip 122, or other type of device, can be embedded in, or mounted to the mower blade and the RFID reader 120, or other type of reader of the detection device 102 can be embedded in, or mounted to a body of the mower. In such embodiments, the detection device 102, via the chip 122 and the reader 120, can detect, for example, a number of hours of cumulative use and compare to a threshold value of a number of hours of use to determine when the blade should be replaced or adjusted and indicate same to a user accordingly via the indicator 108. Additionally, or alternatively, the detection device 102 can determine a degree of wear of the mower blade and/or a wear profile of the mower blade and indicate same to a user accordingly via the indicator 108. Additionally, or alternatively, the detection device 102 can determine an electric current profile as a result of an impact with an object, such as a rock, post, tree stump or root, or other obstacle that is likely to have damaged or otherwise compromised the replaceable and/or adjustable element 104 and/or the performance of the power tool 106. When such an impact occurs, the element 104 is often stopped, or significantly slowed down, which creates a characteristic electric current profile than can be detected by the detection device 102. The detection device 102 can indicate detection of the electric current profile to a user via the indicator 108 that they should inspect or replace the element 104. Such indications can be via a particular colour of LED, or via a particular icon displayed on a display.

In embodiments where the power tool 106 is a chainsaw, the transmitter 122 of the detection device 102, such as the RFID chip 122, can be nested into or otherwise embedded in, or part of the chain drive link, and a transmitter 122 can also, or alternatively, be nested into or otherwise embedded in, or part of the guide bar of the chainsaw, both of which should be changed regularly due to use.

In some embodiments, the transmitter 122 of the detection device 102 can communicate a characteristic of the replaceable and/or adjustable element 104, such as whether the blade is a catching blade, a mulching blade, or a hybrid blade and adjust the RPM of a motor of the power tool 106 to the appropriate speed. For example, catching blades typically need a slightly higher RPM for better performance, whereas mulching blades typically need a lower RPM for better run time.

In some embodiments, based on transmitter 122 in the replaceable and/or adjustable element 104, the indicator 108 of the power tool 106 can recommend operating cutting heights where the element 104 is a blade. For example, catching blades typically need approximately 35-80 mm+ heights to allow for adequate airflow, whereas mulching blades can typically operate from approximately 15-45 mm.

In embodiments where the power tool 106 is a chainsaw, the detection device 102 of the system 100 can inform the user via the indicator 108 if the replaceable and/or adjustable element 104 in the form of a chain is installed incorrectly, e.g. backwards. The detection device 102 of the system 100 can also, or alternatively inform the user via the indicator 108 if the chain is loose. This would happen because the transmitter 122 would be further from the reader 120, or physically be out of range because the chain is too loose. In either situation, the system 100 can disable the power tool 106 until the problem is rectified and inform the user of the problem via the indicator 108.

The skilled addressee will appreciate variations required according to the type of power tool 106 and the nature of the replaceable and/or adjustable element 104 that will nonetheless fall within the scope of the present invention as defined by the attached claims.

Figure 3:
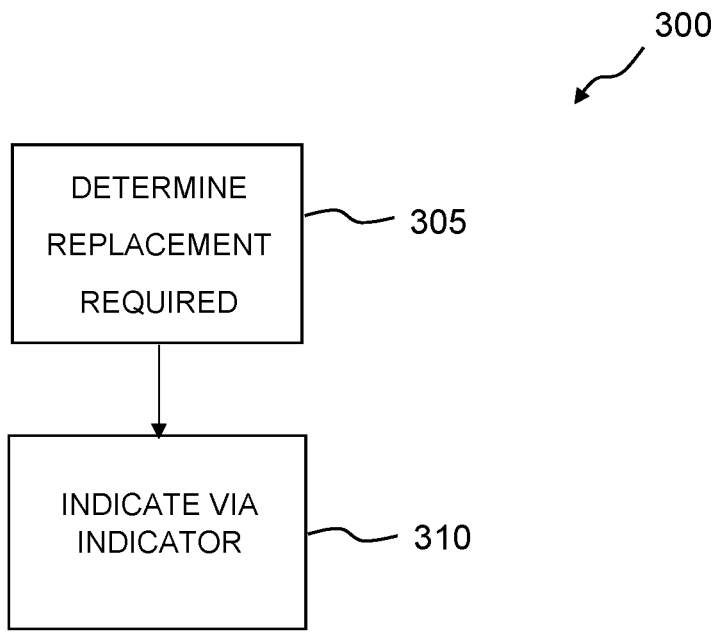
FIG. 3 is a general flow diagram illustrating a power tool element indicating method according to an embodiment of the present invention.

According to other aspects, embodiments of the present invention reside in a power tool element indicating method. With reference to FIG. 3, the method 300 comprises, at 305, determining, by the detection device 102 in communication with the replaceable and/or adjustable element 104 of the power tool 106, that the replaceable and/or adjustable element 104 of the power tool 106 requires replacement or adjustment. At 310, the method 300 comprises indicating, by the indicator 108 in communication with the detection device 102, that the replaceable and/or adjustable element 104 requires replacement or adjustment.

Figure 4:
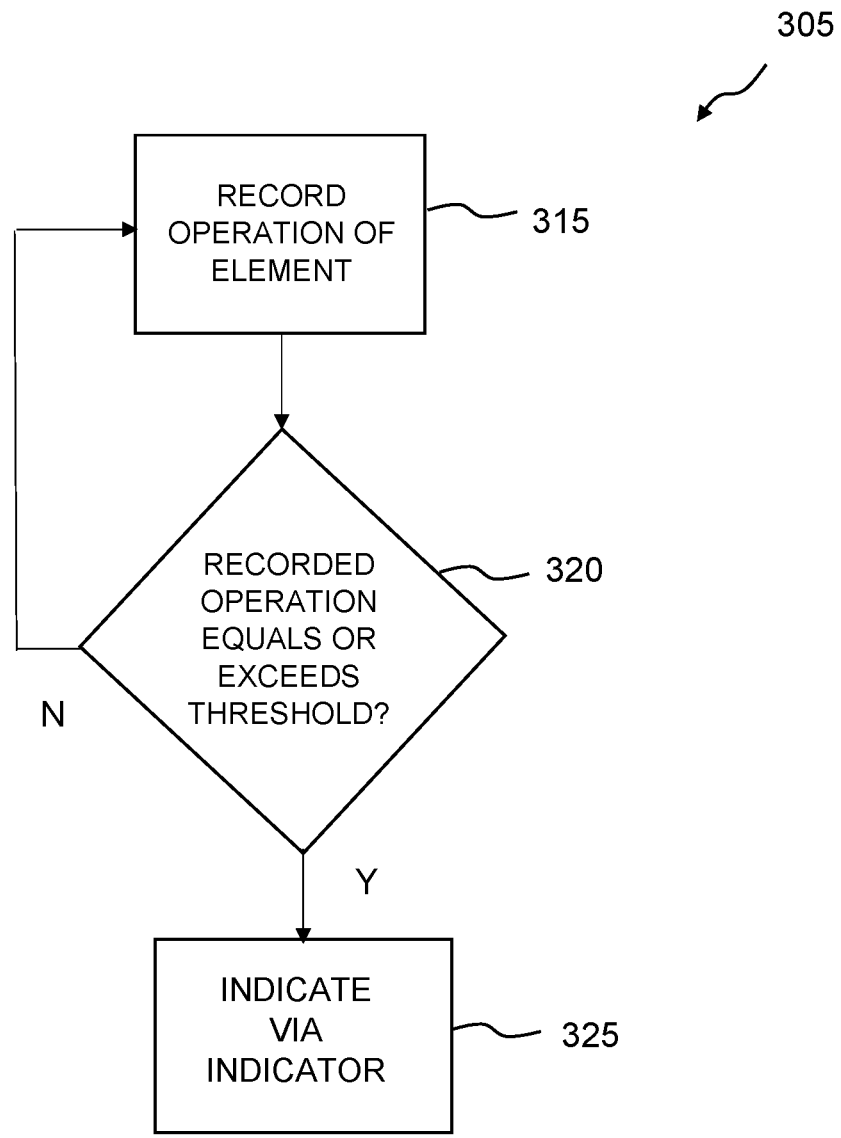
FIG. 4 is a general flow diagram illustrating a power tool element indicating method according to another embodiment of the present invention.

With reference to FIG. 4, according to some embodiments, the step 305 of the detection device 102 determining that the replaceable and/or adjustable element 104 of the power tool 106 requires replacement or adjustment comprises, at 315, the detection device 102 recording operation of the replaceable and/or adjustable element 104. As described herein, recording operation of the element 104 can comprise the detection device 102 recording one or more of the following operations of the replaceable and/or adjustable element 104: a cumulative duration of use; a number of rotations; a rate of rotation; a number of oscillations; a number of reciprocations; a number of cycles; a number of movements. At 320, the method 300 comprises the detection device 102 comparing the recorded operation with a threshold value. At 325, the method comprises the detection device 102 determining that the replaceable and/or adjustable element 104 requires replacement or adjustment when the recorded operation equals or exceeds the threshold value and indicating same via the indicator 108. If the recorded operation does not equal or exceed the threshold value, at 315, the detection device 102 continues recording operation of the replaceable and/or adjustable element 104.

According to some embodiments, two or more operations of the element 104 can be recorded by the detection device 102. In such embodiments, the recorded values for two or more operations of the element 104 can be compared with respective thresholds. In such embodiments, one or more of the thresholds need to be equaled or exceeded for the detection device 102 to determine that the element 104 needs to be replaced or adjusted. Such determinations will depend on the operations of the element 104 being recorded and the power tool 106. For example, where the operations of duration of use and rate of rotation are recorded for the element 104, if the duration of use threshold is not reached or exceeded, if the rate of rotation has been, for example, constantly on a high setting, the detection device 102 may determine that the element 104 needs to be replaced or adjusted.

Figure 5:
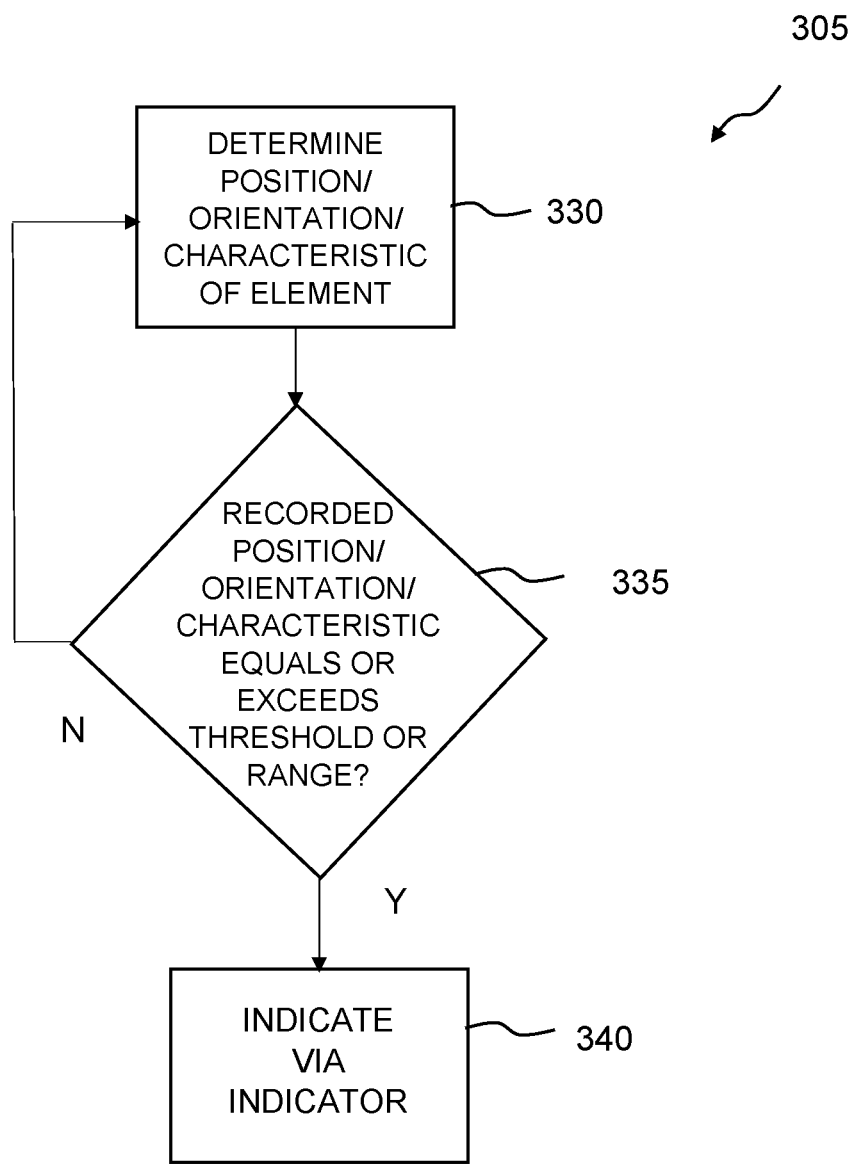
FIG. 5 is a general flow diagram illustrating a power tool element indicating method according to a further embodiment of the present invention.

With reference to FIG. 5, according to some embodiments, the step 305 of the detection device 102 determining that the replaceable and/or adjustable element 104 of the power tool 106 requires replacement or adjustment comprises, at 330, the detection device 102 determining a position and/or orientation and/or other characteristic of the replaceable and/or adjustable element 104. As described herein, such determination can comprise the detection device 102 determining one or more of the following of the replaceable and/or adjustable element 104: a level of wear or a wear profile; an electric current profile, for example caused by high impacts with foreign objects, such as rocks; a separation of the element 104 from a part of the power tool, such as a body or casing; a level of protrusion of the element; an installation orientation; a level of tension. At 335, the method comprises the detection device 102 comparing the determined position and/or orientation and/or other characteristic with a threshold value or a range. At 340, the method comprises the detection device 102 determining that the replaceable and/or adjustable element 104 requires replacement or adjustment when the determined position and/or orientation and/or other characteristic does not comply with the threshold value or the range and indicating same via the indicator 108. If the determined position and/or orientation and/or other characteristic does not equal or exceed the threshold value or range, at 330, the detection device 102 continues determining the position and/or orientation and/or other characteristic of the replaceable and/or adjustable element 104.

According to some embodiments, two or more of a position and/or orientation and/or other characteristic of the element 104 can be determined by the detection device 102. In such embodiments, the recorded values for two or more of a position and/or orientation and/or other characteristic of the element 104 can be compared with respective thresholds or ranges. In such embodiments, one or more of the thresholds or ranges need to be equaled or exceeded for the detection device 102 to determine that the element 104 needs to be replaced or adjusted or inspected. Such determinations will depend on the position and/or orientation and/or other characteristic of the element 104 being recorded and the power tool 106. For example, where a position and a wear profile are determined for the element 104, if the position threshold or range is not exceeded, if the wear profile is such that the element can no longer be used, or will not perform its function efficiently and/or effectively, the detection device 102 can determine that the element 104 needs to be replaced.

Figure 6:
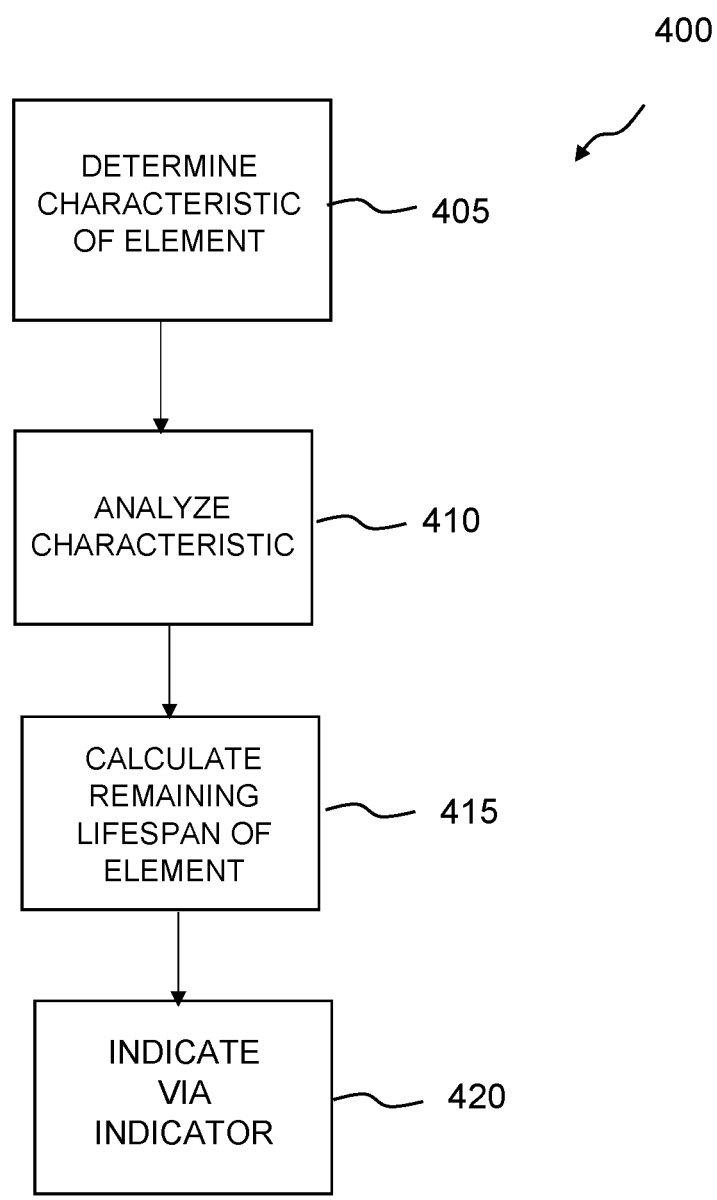
FIG. 6 is a general flow diagram illustrating a power tool element indicating method according to a yet further embodiment of the present invention.

With reference to FIG. 6, according to some embodiments, a method 400 of the present invention comprises, at 405, the detection device 102 determining a characteristic associated with the replaceable and/or adjustable element 104, such as an electric current profile caused by impacts of the element 104 with foreign bodies, such as rocks, posts, tree stumps or the like, that can potentially damage the element 104. The method 400 comprises, at 410, the detection device 102 analyzing the determined characteristic of the replaceable and/or adjustable element 104. At 415, the method comprises determining an estimated remaining lifespan of the replaceable and/or adjustable element 104. The method comprises at 420, the detection device 102 transmitting the calculated estimated remaining lifespan to the indicator 108. For example, the estimated remaining lifespan can be displayed to the user via a display, in the form of, for example, a number of remaining hours of use or an icon.

Figure 7:
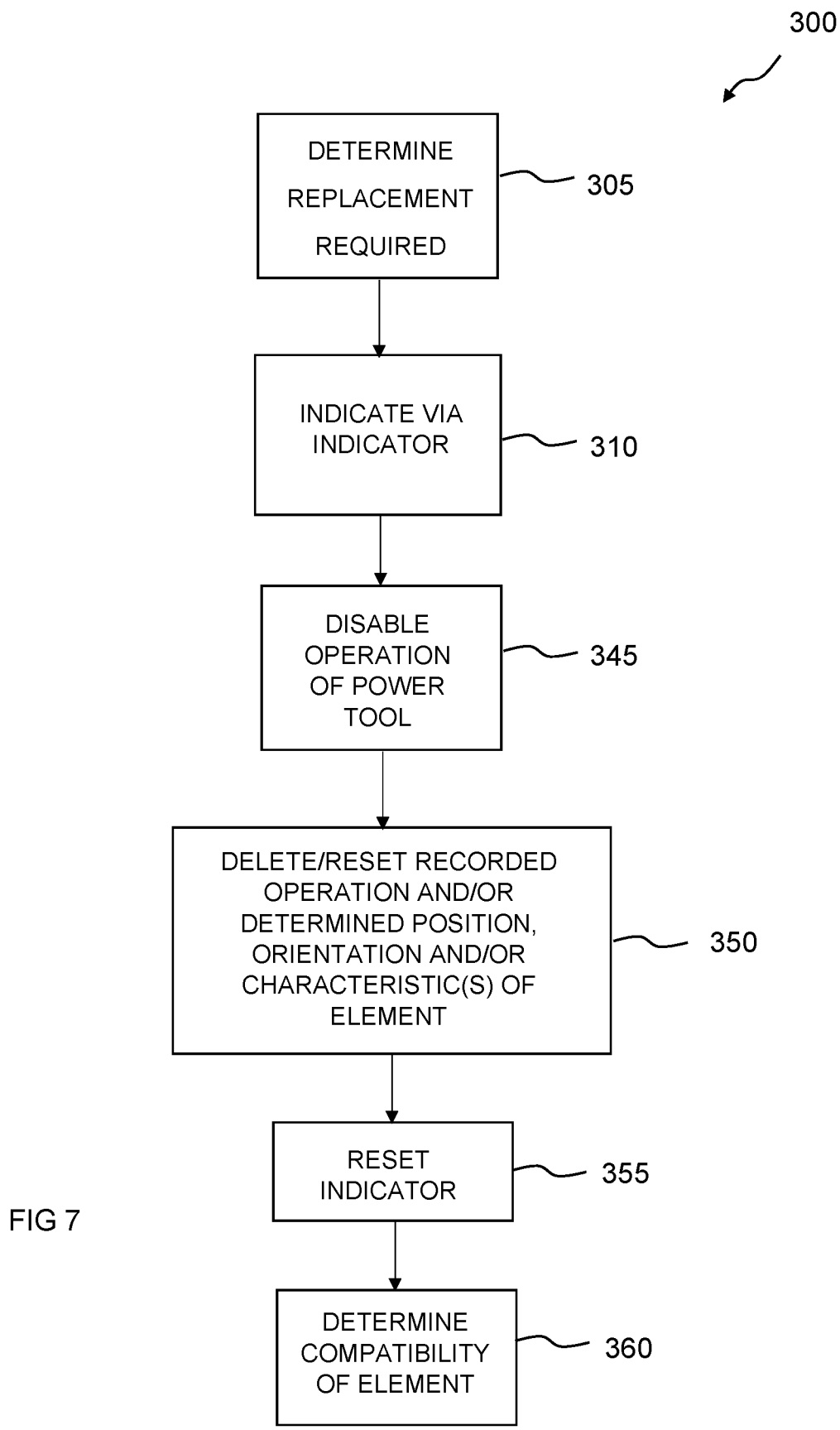
FIG. 7 is a general flow diagram illustrating a power tool element indicating method according to another embodiment of the present invention.

With reference to the method 300 shown in FIG. 7, according to some embodiments, where the detection device 102 determines, at 305, that the element 104 needs to be replaced or adjusted and, at 310, the detection device 102 has indicated same via indicator 108, at 345, the method 300 can comprise the detection device 102 disabling operation of the power tool 106 until the element 104 has be suitably adjusted or replaced.

According to some embodiments, at 350, the method 300 can comprise the detection device 102 resetting or deleting the recorded operation and/or determined position, orientation and/or characteristic(s) of the replaceable element 104 when the detection device 102 determines that the replaceable element 104 has been replaced.

According to some embodiments, at 355, the method 300 can comprise the detection device 102 resetting the indicator 108 when the detection device 102 determines that the replaceable and/or adjustable element 104 has been replaced or adjusted.

According to some embodiments, at 360, the method 300 can comprise the detection device 102 determining whether the replaceable and/or adjustable element 104 is compatible with the power tool 106. It will be appreciated that in embodiments in which the compatibility of the element 104 is determined, this step can occur before the data relating to the previous element 104 is deleted or reset and/or before the indicator 108 is reset.

According to another aspect, the present invention resides in a power tool element indicating system 100 comprising the detection device 102 in communication with the replaceable and/or adjustable element 104 of the power tool 106 to determine one or more characteristics of the replaceable and/or adjustable element 104 and analyze the one or more characteristics to determine an estimated remaining lifespan of the replaceable and/or adjustable element, as described herein. The system comprises the indicator 108 in communication with the detection device 102 to display the estimated remaining lifespan of the replaceable and/or adjustable element 104. It will be appreciated that in preferred embodiments, the detection device 102 is also configured to perform one or more of the aforementioned operations of the detection device 102 as described herein.

Another aspect of the present invention resides in the power tool 106 comprising the power tool element indicating systems 100 and methods 300, 400 as described herein. It will be appreciated that the power tool element indicating systems 100 and methods 300, 400 are applicable to a wide range of power tools having one or more replaceable and/or adjustable elements 104. For example, embodiments of the present invention are applicable to power tools such as, but not limited to lawn mowers, lawn edgers, circular saws, jigsaws, reciprocating saws, mulchers, chippers, chainsaws, pole pruners, drills, power files, sanders, such as belt sanders and orbital sanders, grinders, hedge trimmers, staplers, sweepers, routers; nail guns and other tools.

Hence, embodiments of the present invention address, or at least ameliorate one or more of the aforementioned problems by the detection device 102 determining whether the replaceable and/or adjustable element 104 of the power tool 106 requires replacement or adjustment and indicating to a user via the indicator 108 that the replaceable and/or adjustable element 104 of the power tool 106 requires replacement or adjustment. The user can then adjust or replace the element 104 to ensure efficient and effective operation of the power tool and reduce the likelihood of damage to the power tool and/or the user. The present invention is particularly useful when the element 104 is not visible to the user during ordinary use of the power tool and/or where it is not readily apparent to the user that the element 104 needs replacement or adjustment.

Embodiments of the present invention can include recording one or more operations of the element 104, such as duration of use, number of rotations, rate of rotation and the like, and/or one or more of a position, orientation and/or other characteristic of the element, such as a level of wear, a wear profile and/or an electric current profile to determine whether the replaceable and/or adjustable element 104 of the power tool 106 requires replacement or adjustment. Some embodiments comprise calculating an estimated remaining lifespan of the element 104 and/or determining a compatibility of the element 104 with the power tool 106. In some embodiments, the detection device 102 can communicate with a computing device 112 of the user to inform the user that the element 104 requires adjustment or replacement and the user can communicate with the detection device 102 via their computing device 112.

In this specification, the terms, "first", "second" etc. are intended to differentiate between different features of the present invention and are not intended to limit the present invention to a particular order of implementation unless the context indicates otherwise.

In this specification, the terms "comprises", "comprising" or similar terms are intended to mean a non-exclusive inclusion, such that an apparatus that comprises a list of elements does not include those elements solely but may well include other elements not listed.

The reference to any prior art in this specification is not, and should not be taken as, an acknowledgement or any form of suggestion that the prior art forms part of the common general knowledge.

It will be appreciated that the present invention is not limited to the specific embodiments described herein. Skilled addressees will identify variations from the specific embodiments described herein that will nonetheless fall within the scope of the present invention, which is determined by the following claims.

The invention claimed is:

1. A power tool element indicating system for a portable power tool, the power tool element indicating system comprising:
   a detection device in communication with an element of the power tool to determine whether the element of the power tool requires replacement and whether the element of the power tool requires adjustment, wherein the detection device is configured to:
      record one or more of the following operations of the element: a cumulative duration of use; a number of rotations; a rate of rotation; a number of oscillations; a number of reciprocations; a number of cycles; a number of movements,
      compare the recorded operation with a replacement threshold value and an adjustment threshold value different than the replacement threshold value,
      determine that the element requires replacement when the recorded operation equals or exceeds the replacement threshold value, and
      determine that the element requires adjustment when the recorded operation equals or exceeds the adjustment threshold value; and
   an indicator in communication with the detection device to indicate that the element requires replacement in response to the determined replacement requirement or that the element requires adjustment in response to the determined adjustment requirement,
   wherein the power tool element indicating system is part of the portable power tool.

2. The system of claim 1, wherein the detection device is configured to determine one or more of the following of the element: a level of wear; a wear profile; an electric current profile; a separation from a part of the power tool; a level of protrusion; an installation orientation; a level of tension.

3. The system of claim 1, wherein the detection device analyses a determined characteristic of the element to determine an estimated remaining lifespan of the element.

4. The system of claim 1, wherein the detection device disables operation of the power tool if the detection device determines that the element requires the replacement or the adjustment.

5. The system of claim 1, wherein the detection device resets or deletes the recorded operation of the element when the detection device determines that the element has been replaced.

6. The system of claim 1, wherein the detection device resets the indicator when the detection device determines that the element has been replaced or adjusted.

7. The system of claim 1, wherein the detection device determines whether the element is compatible with the power tool.

8. The system of claim 1, wherein the indicator comprises one or more of the following: an illumination device; an LED; a display; a liquid crystal display (LCD); a touch sensitive display; an audible indicator.

9. The system of claim 8, wherein the indicator is part of a user's computing device, such as a mobile phone, tablet or computer.

10. The system of claim 1, wherein the detection device comprises a wireless reader mounted on, in or to the power tool, the wireless reader in communication with a wireless transmitter attached to, embedded in, or part of the element.

11. A power tool element indicating method for a portable power tool, the method comprising:
   recording, by a detection device in communication with an element of the portable power tool, one or more of the following operations of the element: a cumulative duration of use; a number of rotations; a rate of rotation; a number of oscillations; a number of reciprocations; a number of cycles; a number of movements;
   comparing, by the detection device, the recorded operation with a replacement threshold value and an adjustment threshold value different than the replacement threshold;
   determining that the element requires replacement when the recorded operation equals or exceeds the replacement threshold value;
   determining that the element requires adjustment when the recorded operation equals or exceeds the adjustment threshold value; and
   indicating, by an indicator in communication with the detection device, that the element requires the replacement or the adjustment.

12. The method of claim 11, comprising the detection device:
   determining a position and/or orientation and/or other characteristic of the element;
   comparing the determined position and/or orientation and/or other characteristic with a threshold value or a range;
   determining that the element requires replacement when the determined position and/or orientation and/or other characteristic does not comply with the replacement threshold value; and
   determining that the element requires adjustment when the determined position and/or orientation and/or other characteristic does not comply with the adjustment threshold value.

13. The method of claim 12, comprising the detection device determining one or more of the following of the element: a level of wear; a profile; a separation from a part of the power tool; a level of protrusion; an installation orientation; a level of tension.

14. The method of claim 11, comprising the detection device analyzing a determined characteristic of the element and determining an estimated remaining lifespan of the element.

15. The method of claim 11, comprising the detection device disabling operation of the power tool if the detection device determines that the element requires the replacement or the adjustment.

16. The method of claim 11, comprising the detection device resetting or deleting the recorded operation of the element when the detection device determines that the element has been replaced.

17. The method of claim 11, comprising the detection device resetting the indicator when the detection device determines that the element has been replaced or adjusted.

18. The method of claim 11, comprising the detection device determining whether the element is compatible with the portable power tool.

19. The method of claim 11, wherein the indicator comprises one or more of the following: an illumination device; an LED; a display; a liquid crystal display (LCD); a touch sensitive display; an audible indicator.

20. The method of claim 11, wherein the detection device comprises a wireless reader mounted on, in or to the power tool, the wireless reader in communication with a wireless transmitter attached to, embedded in, or part of the element.

21. A power tool element indicating system for a portable power tool, the power tool element indicating system comprising:

a detection device in communication with an element of the power tool to determine whether the element of the power tool requires replacement and whether the element of the power tool requires adjustment, wherein the detection device is configured to:
record an operation of the element;
compare the recorded operation with a replacement threshold value or range and an adjustment threshold value or range different than the replacement threshold value or range;
determine that the element requires replacement when the recorded operation equals or exceeds the replacement threshold value; and
determine that the element requires adjustment when the recorded operation equals or exceeds the adjustment threshold value; and
an indicator in communication with the detection device to indicate that the element requires the replacement or the adjustment in response to the one or more operations of the element recorded by the detection device, wherein the power tool element indicating system is part of the portable power tool.

22. The system of claim 21, wherein the indicator is configured to display the estimated remaining lifespan of the element.

23. The system of claim 21, wherein the portable power tool is selected from one of the following: a lawn mower; a lawn edger; a circular saw; a jigsaw; a reciprocating saw; a mulcher; a chipper; a chainsaw; a pole pruner; a drill; a power file; a sander; a belt sander; an orbital sander; a grinder; a hedge trimmer; a stapler; a sweeper; a router; a nail gun.

24. The system of claim 21, wherein the element is selected from one of the following: a blade; a catching blade; a cutting blade; a mulching blade; a hybrid blade; a chainsaw chain; an abrading element; a brush; a drill chuck; a carriage; a carrier.

* * * * *